United States Patent
Lee et al.

(10) Patent No.: US 8,082,657 B2
(45) Date of Patent: Dec. 27, 2011

(54) METHOD FOR MANUFACTURING AN ELECTRICAL LAPPING GUIDE FOR MAGNETIC WRITE HEAD CORE WIDTH OPTIMIZATION

(75) Inventors: Edward Hin Pong Lee, San Jose, CA (US); Vladimir Nikitin, Campbell, CA (US); Michael Ming Hsiang Yang, Campbell, CA (US); Yuan Yao, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 374 days.

(21) Appl. No.: 12/345,773

(22) Filed: Dec. 30, 2008

(65) Prior Publication Data

US 2010/0162555 A1 Jul. 1, 2010

(51) Int. Cl.
*G11B 5/127* (2006.01)
*H04R 31/00* (2006.01)

(52) U.S. Cl. ............... 29/603.06; 29/603.03; 29/603.12; 29/603.13; 29/603.15; 29/603.16; 360/121; 360/122; 360/317; 451/5; 451/41

(58) Field of Classification Search ............... 29/603.12, 29/603.15, 603.16, 603.18; 360/121, 122, 360/317; 427/127, 128; 451/5, 8, 10, 36, 451/37, 41
See application file for complete search history.

(56) References Cited

U.S. PATENT DOCUMENTS

| | | | |
|---|---|---|---|
| 6,786,803 B2 | 9/2004 | Crawforth et al. | 451/41 |
| 7,014,530 B2 | 3/2006 | Kasiraj et al. | 451/8 |
| 7,861,400 B2 * | 1/2011 | Lille | 29/603.09 |
| 2006/0028770 A1 | 2/2006 | Etoh et al. | 360/313 |
| 2006/0168798 A1 * | 8/2006 | Naka | 29/603.16 |
| 2008/0022510 A1 | 1/2008 | Tanaka | 29/603.16 |
| 2008/0072418 A1 | 3/2008 | Kondo et al. | 29/603.12 |
| 2008/0144215 A1 * | 6/2008 | Hsiao et al. | 360/119.04 |

* cited by examiner

*Primary Examiner* — Paul D Kim
(74) *Attorney, Agent, or Firm* — Zilka-Kotab, PC

(57) ABSTRACT

A method for manufacturing a magnetic write head that allows the location of the flare point of a write pole to be accurately located relative to the air bearing surface. The method includes the construction of a lapping guide having an edge feature that is easily and accurately located relative to the flare point of the write pole. This edge feature provides an abrupt change in electrical resistance across the lapping guide at a point when lapping should be terminated. And, since this feature can accurately located relative to the flare point, this provides an easily discernable ending point for lapping.

14 Claims, 30 Drawing Sheets

METHOD FOR MANUFACTURING AN ELECTRICAL LAPPING GUIDE FOR MAGNETIC WRITE HEAD CORE WIDTH OPTIMIZATION

FIELD OF THE INVENTION

The present invention relates to perpendicular magnetic data recording, and more particularly to a method for employing an electronic lapping guide to accurately locate a flare point of a magnetic write head relative to an air bearing surface.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic write head that allows the location of the flare point of a write pole to be accurately located relative to the air bearing surface. The method includes the construction of a lapping guide having an edge feature that is easily and accurately located relative to the flare point of the write pole. This edge feature provides an abrupt change in electrical resistance across the lapping guide at a point when lapping should be terminated. And, since this feature can accurately located relative to the flare point, this provides an easily discernable ending point for lapping.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
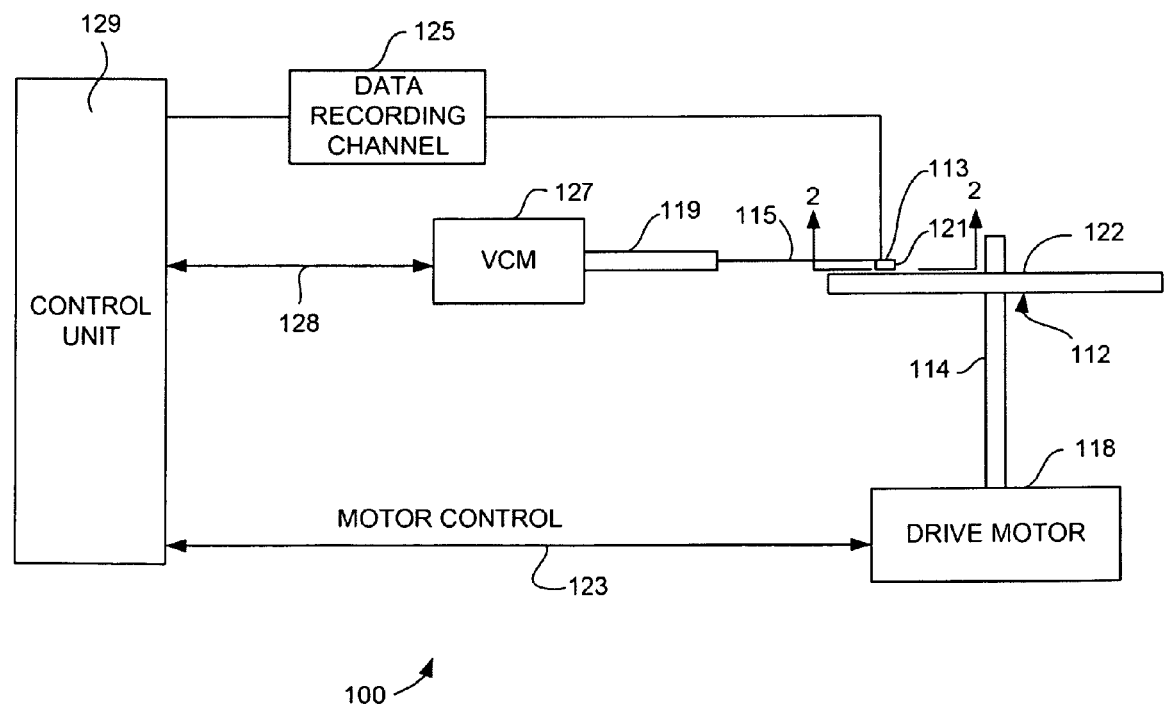
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
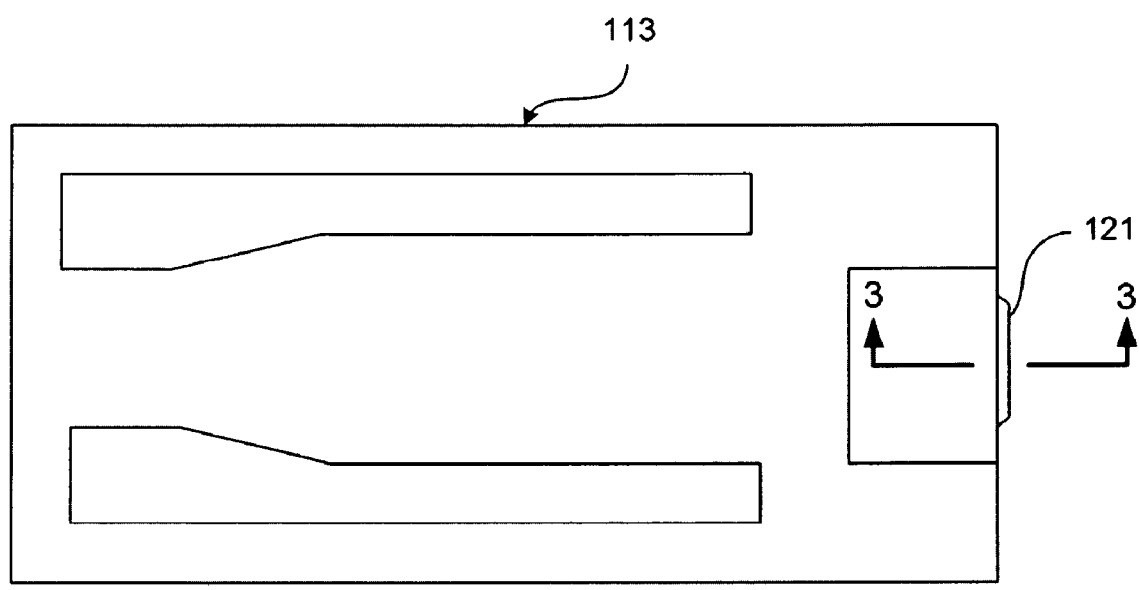
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
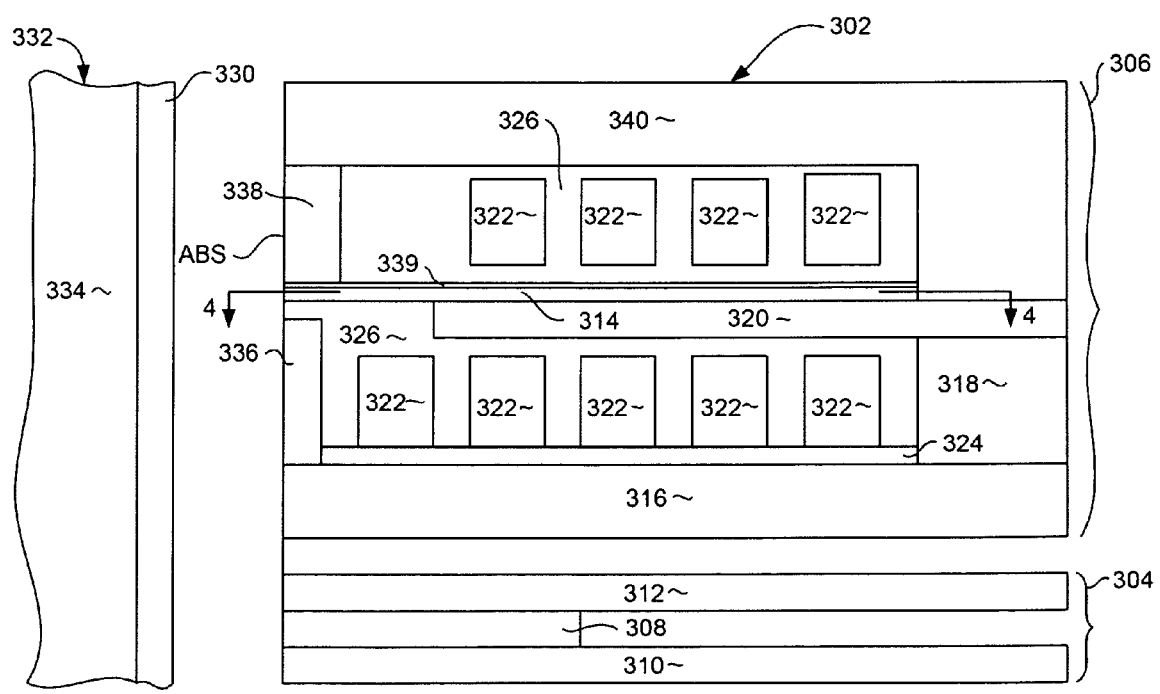
FIG. 3 is a cross sectional view of a magnetic head, taken from line 3-3 of FIG. 2 and rotated 90 degrees counterclockwise, of a magnetic head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil 322 can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and weak that it does not erase the data bit recorded by the write pole 314. A magnetic pedestal 336 may be provided at the air bearing surface ABS and attached to the return pole 316 to prevent stray magnetic fields from the bottom leads of the write coil 322 from affecting the magnetic signal recorded to the medium 332.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic layer 339. The trailing shield 338 attracts the magnetic field from the write pole 314, which slightly cants the angle of the magnetic field emitting from the write pole 314. This canting of the write field increases the speed with which write field polarity can be switched by increasing the field gradient. A trailing magnetic return pole 340 can be provided and can be magnetically connected with the trailing shield 338. Therefore, the trailing return pole 340 can magnetically connect the trailing magnetic shield 338 with the back portion of the write pole 302, such as with the back end of the shaping layer 320 and with the back gap layer 318. The magnetic trailing shield is also a second return pole so that in addition to magnetic flux being conducted through the medium 332 to the return pole 316, the magnetic flux also flows through the medium 332 to the trailing return pole 340.

Figure 4:
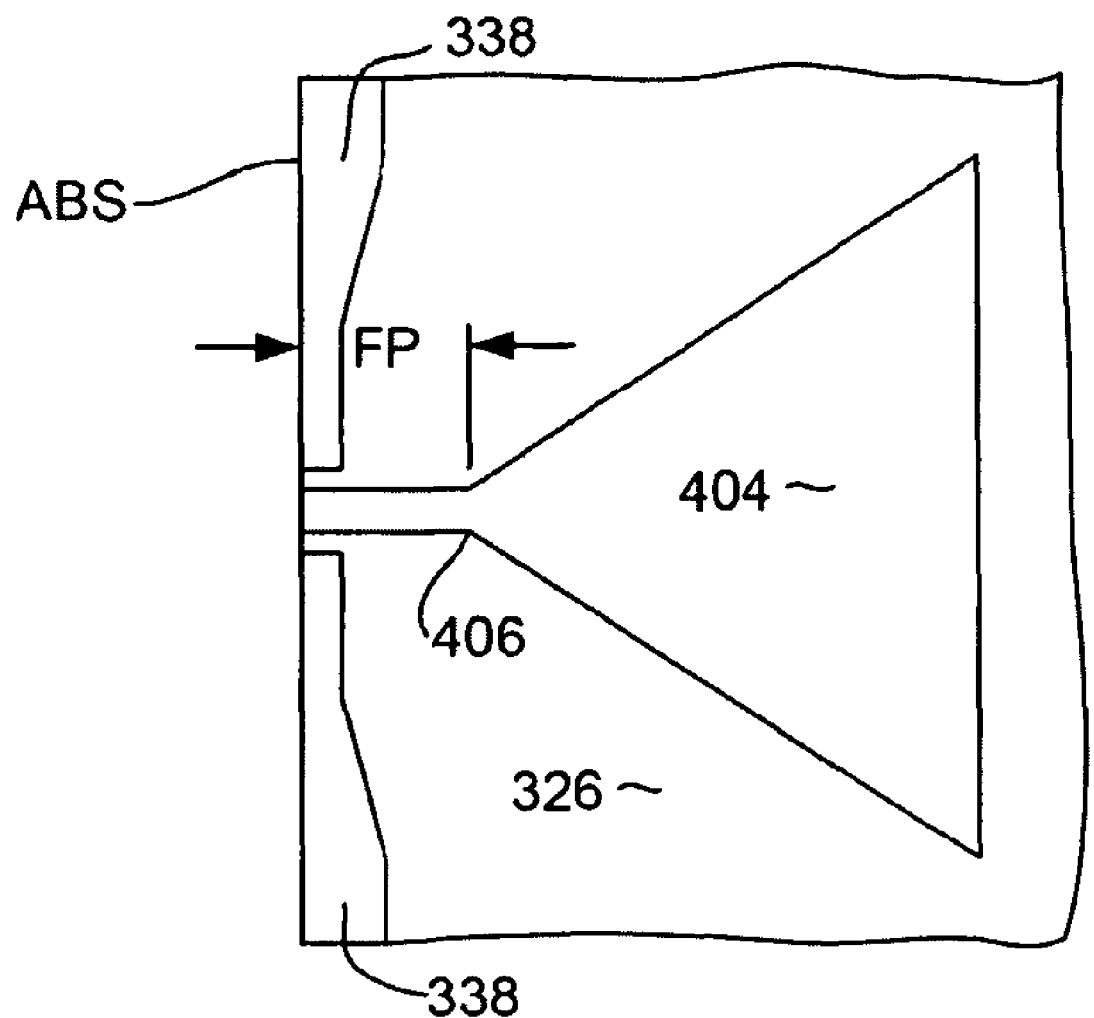
FIG. 4 is a top-down, cross sectional view taken from line 4-4 of FIG. 3.

With reference now to FIG. 4, a top down view taken from line 4-4 of FIG. 3, shows the write pole 314 and side portions of the shield 338. As can be seen, the write pole includes a narrow pole tip portion 402 and a wider flared portion 404, the transition between the flared portion 404 and pole tip portion 402 defining a flare point 406 and also defines a flare point distance FP as measured from the air bearing surface (ABS). This location or distance FP of the flare point 406 is important to proper functioning of the write head. If the distance FP is too large, then magnetic flux within the write pole 314 will become choked off, resulting in a loss of write field strength. If the distance FP is too small, then flux will leak from the flared portion 404 to the adjacent magnetic medium 332 (FIG. 3), resulting in adjacent track erasure.

Therefore, it is very important to accurately locate the flare point FP during manufacture of the write head. Unfortunately, during manufacture of the write head, several factors can conspire to make accurate definition of the FP difficult to achieve. For example, imperfections in the photolithotraphic definition of the write pole 404 either within a wafer or between wafers can cause variation of FP. Also, as those skilled in the art will appreciate, the location of the flare point FP is defined by a lapping operation. After thousands of head have been formed on a wafer, the wafer is cut into quadrants, with many rows of sliders being formed on each quadrant. These quadrants are then subjected to a lapping operation, that removes wafer and head material (from the left as shown in FIGS. 3 and 4) to define the location of the air bearing surface (ABS). Ideally, the lapping would be terminated exactly when the location of the desired ABS plane has been reached (i.e. to define the desired distance for FP). Unfortunately, such lapping operations are difficult to control accurately, making an exact location of the ABS, and exact definition of FP difficult to achieve.

The present invention provides a way to very accurately define the location of the ABS relative to the flare point 406, in order to accurately define the distance FP. This is achieved by a lapping guide that is patterned in the same processing steps used to define the write pole, so that even with variation in photolithographic patterning and definition of the write pole, the location of the flare point 406 relative to the ABS can be accurately maintained. In addition, the lapping guide is manufactured in a manner results in large resistance change at a desired lapping point, making it a very easy matter to determine when lapping should be terminated. These advantages and features will be clearer upon reading the following, in conjunction with FIGS. 5-20, which illustrate a method for manufacturing a lapping guide, and with reference to FIG. 20 which shows how a signal from such a lapping guide can easily indicate when lapping should be terminated.

Figure 5:
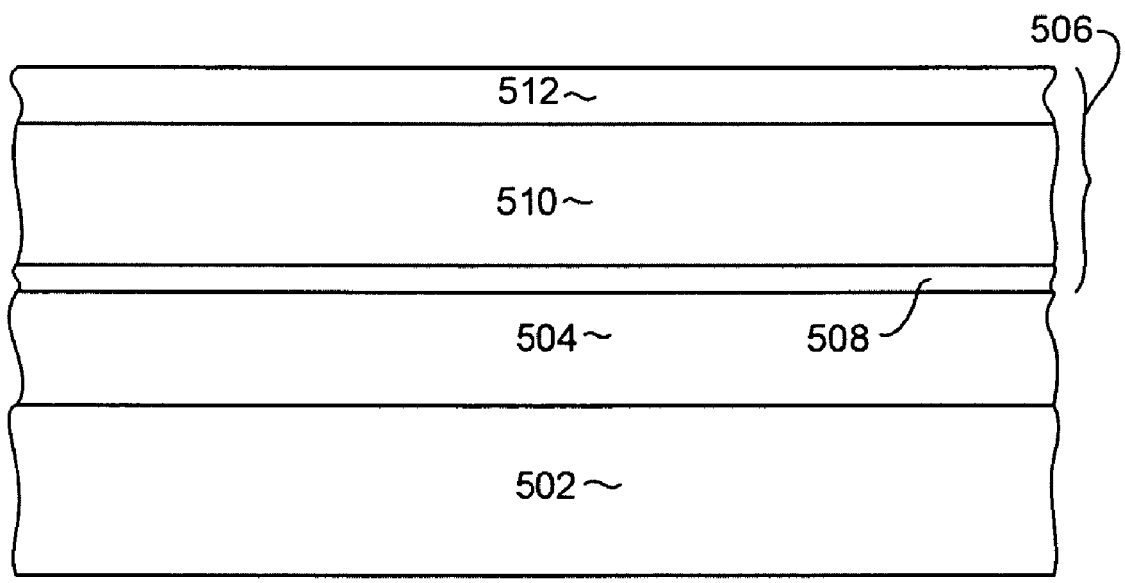
FIGS. 5-20 are views of a write head lapping guide in various intermediate stages of manufacturing illustrating a method for manufacturing a lapping guide according to an embodiment of the invention.

With reference now to FIG. 5, a substrate 502 is provided. The substrate 502 can include the insulation layer 326 and all or a portion of the shaping layer 320 of FIG. 3. A magnetic write pole material 504 is deposited over the substrate. The write pole material 504 can be a lamination of high magnetic moment layers such as CoFe separated by thin non-magnetic layers. One or more mask layers 506 are then deposited over the magnetic write pole material 504. The mask structure can include a hard mask 508, such as a thin alumina hard mask, formed directly on top of the write pole material 504, an image transfer layer 510, which can be a soluble polyimide such as DURAMIDE®, and a resist layer 512. The mask layers 506 could include other materials as well, such as other hard mask layers or a bottom anti-reflective coating layer (not shown).

Figure 6:
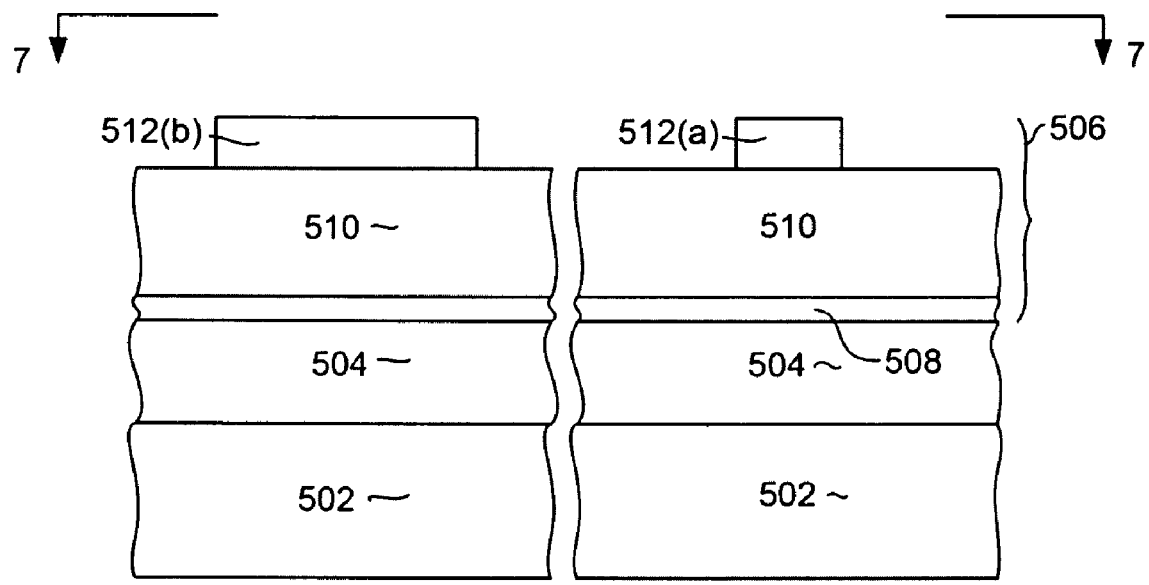
Figure 7:
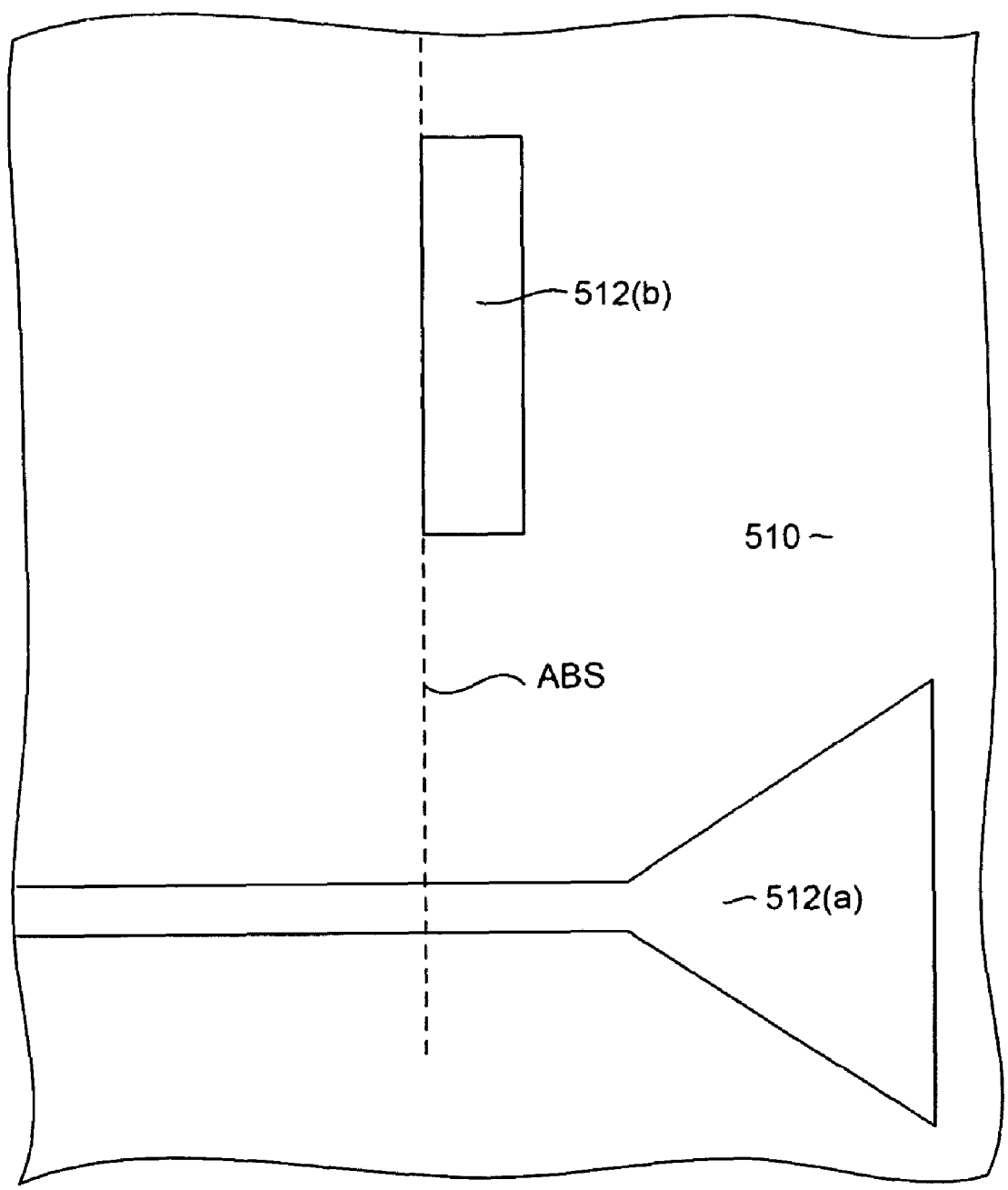

With reference to FIG. 6, the photoresist layer 512 is photolithographically patterned to form a mask structure. This includes a portion 512(a) located in the write head area that is configured to define a write pole and a portion 512(b) in a kerf region, removed from the write head area, that is configured to define an electrical lapping guide portion. These can be seen more clearly with reference to FIG. 7, which shows a top down view as taken from line 7-7 of FIG. 6 and rotated 90 clockwise. As shown in FIG. 7, the lapping guide portion 512(b) has a front edge that is located at a desired location relative to an intended air bearing surface plane (ABS). For example, the front edge of the mask portion 512(b) can be located at the ABS plane as shown in FIG. 7.

Figure 8:
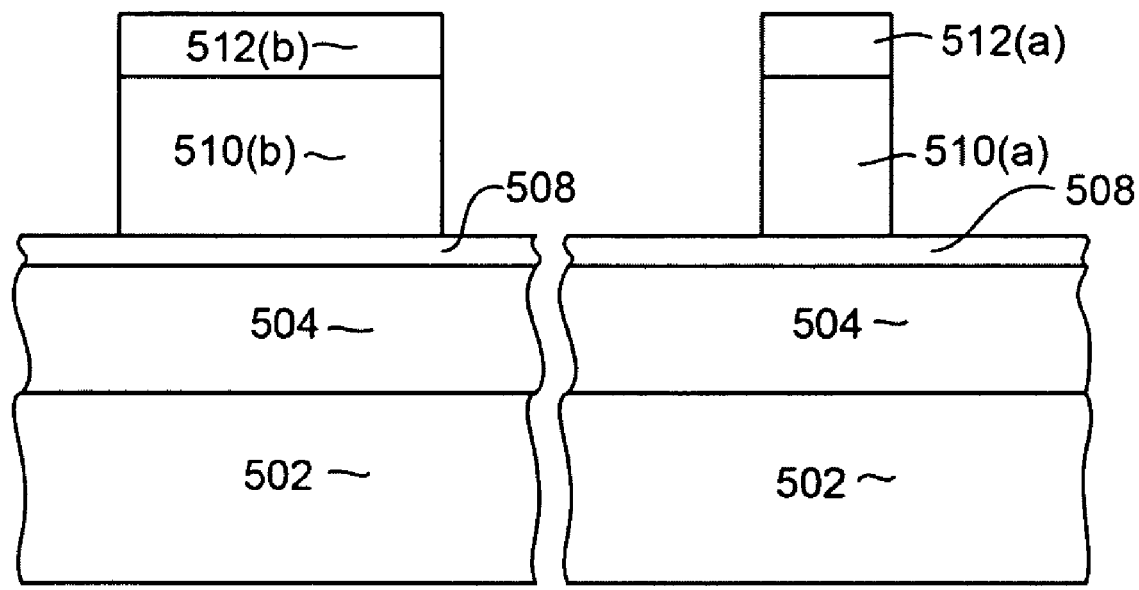
Figure 9:
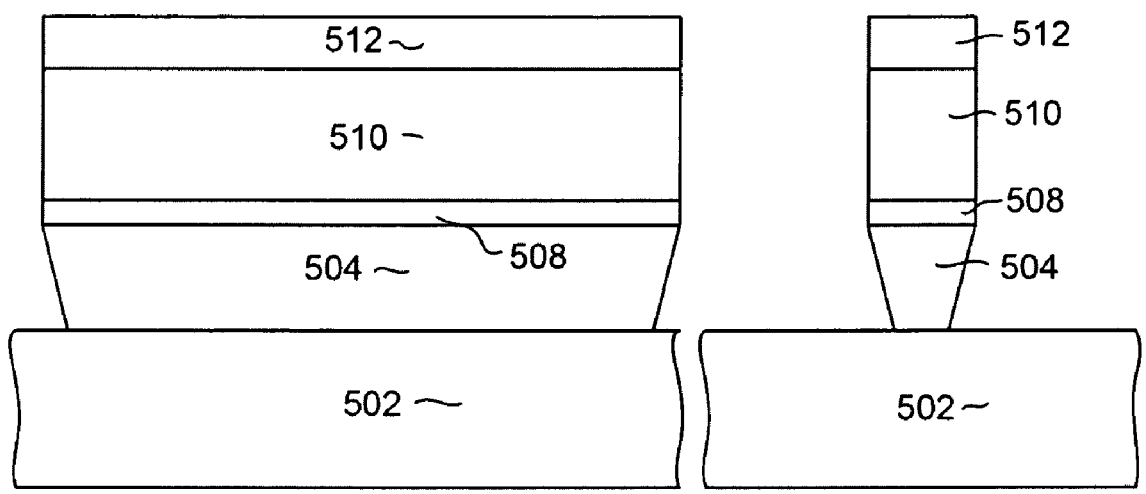

With reference now to FIG. 8, one or more material removal processes are performed to transfer the image of the patterned resist layer 512 onto the underlying layer or layers 510 by removing material that is not protected by the mask 512. The material removal process may include one more reactive ion etching processes. Then, an ion milling process is performed to transfer the image of the mask layers 510, 512 onto the underlying hard mask 508 and write pole material 504 by removing material 508, 504 that is not protected by the mask layers 510, 512. The ion milling is preferably a sweeping ion milling performed at one or more angles relative to normal to form the write pole material 504 with tapered sides as shown in FIG. 9. This leaves the write pole material 504 forming a write pole structure 504(a) and a lapping guide step structure 504(b).

Figure 10:
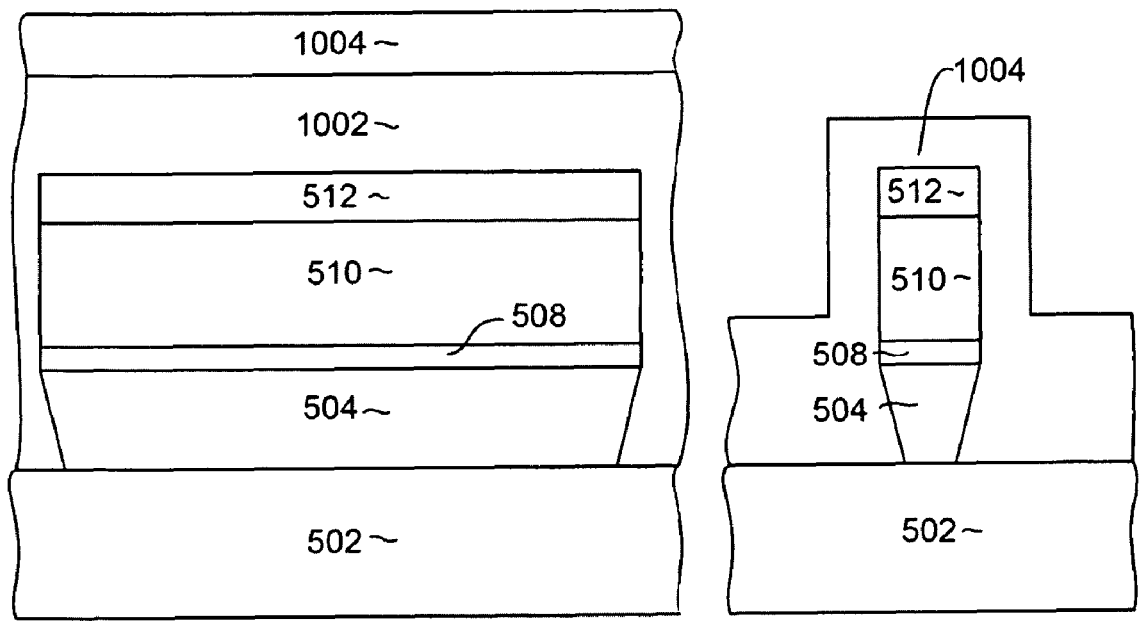
Figure 11:
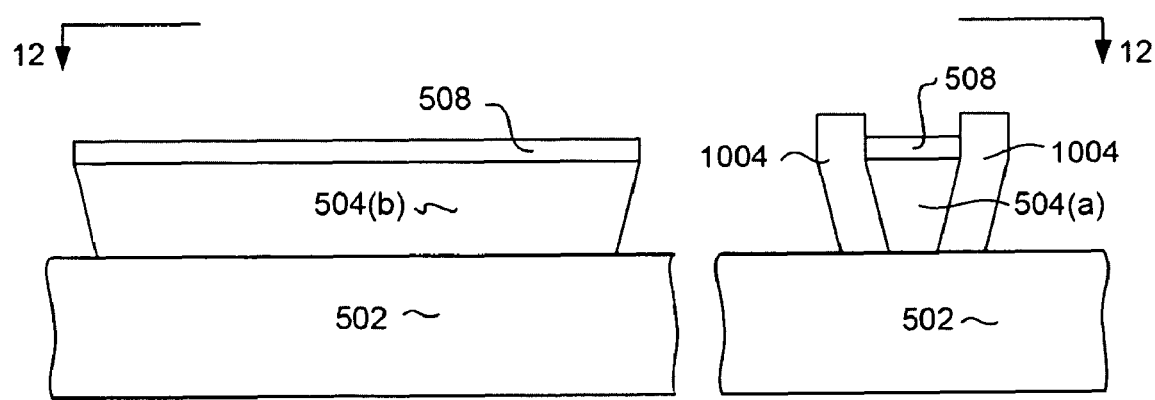
Figure 12:
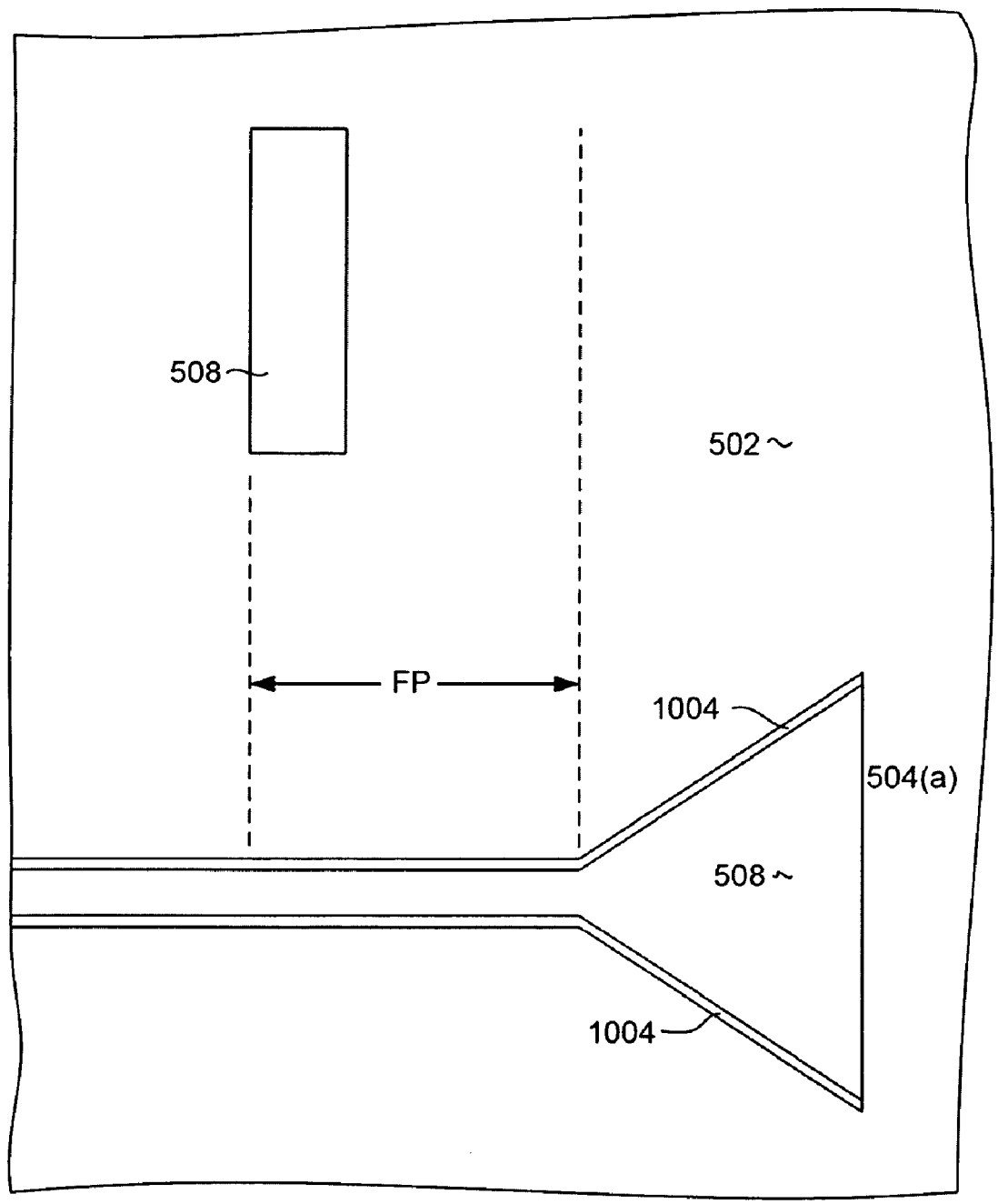

Then, with reference to FIG. 10, mask layer 1002 is formed over the lapping guide region, and a non-magnetic side gap material 1004 is deposited. The side gap material 1002 is preferably alumina and is preferably deposited by a conformal deposition process such as atomic layer deposition. Then, another material removal process such as reactive ion etching, reactive ion milling or ion milling is performed to preferentially remove horizontally disposed portions of the side gap material, leaving non-magnetic side walls 1004 on the write pole 504. Also, the mask 1002 can be lifted off, leaving a structure such as that shown in FIG. 11. The configuration write pole structure 504(a) and electrical lapping guide 504(b). The thin alumina hard mask 508 may remain over the write pole material 504(a) and 504(b) and can provide a portion of a trailing shield gap, as will become clearer below.

Figure 13:
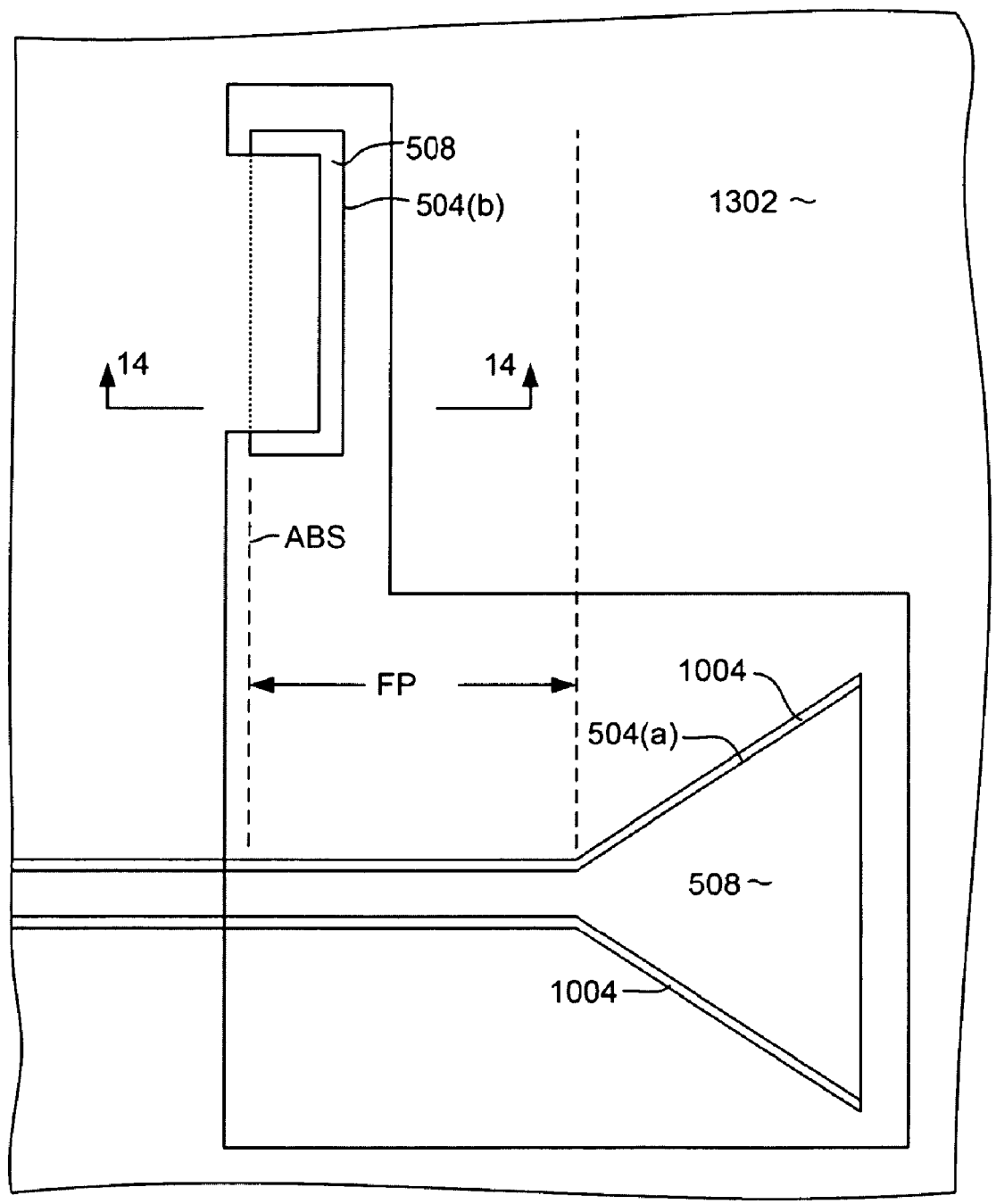

With reference to FIG. 13, a liftoff process is used to deposit a layer of a low resistivity, electrically conductive material 1302. The electrically conductive material is preferably Au, but could be some other material as well, such as Cu, and will be referred to herein as Au layer 1302. The Au layer 1302 is formed to cover a portion of the electrical lapping guide structure portion of the write pole material 540(b) as shown in FIG. 13. The Au layer 1302 preferably does not cover the write pole structure 504(a) or the area around the write pole structure 504(a). The Au layer 1302 can be deposited by first forming a mask structure (not shown), which is preferably a bi-layer mask structure. This mask structure can cover an area over and around the write pole structure 504(a) and also possibly covering a back edge of the lapping guide structure 504(b). This mask, however, leaves a desired portion of the lapping guide structure 504(b) uncovered. The Au layer 1302 can then be deposited full film such as by sputter deposition. The mask structure can then be lifted off, leaving the structure shown in FIG. 13. Any of the Au layer 1302 that was deposited over the mask structure will be lifted off with the mask structure.

Figure 14:
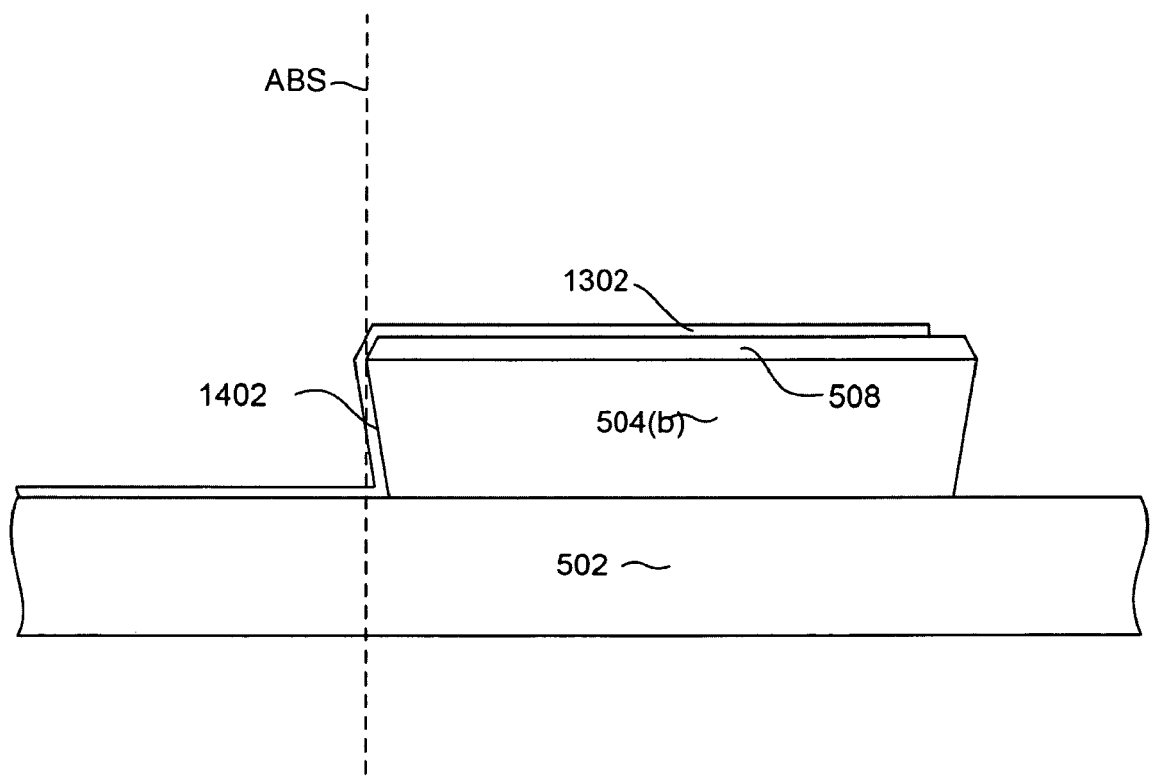

FIG. 14 shows an enlarged, side cross sectional view taken from line 14-14 FIG. 13. As shown in FIG. 14 the Au layer 1302 covers a portion of the lapping guide structure 504(b) and terminates near the back of the lapping guide structure 504(b). The magnetic write pole material that forms the lapping guide structure 504(b) advantageously has a front edge 1402 that is oriented non-parallel with the substrate 502 and that can be accurately located relative to an air bearing surface. The Au layer 1302 not only covers a portion of the write pole material of the lapping guide structure 504(b), but also extends over the front edge 1402 and extends (to the left in FIG. 14) beyond the air bearing surface plane in a direction from which lapping will proceed as will be clearer below.

Figure 15:
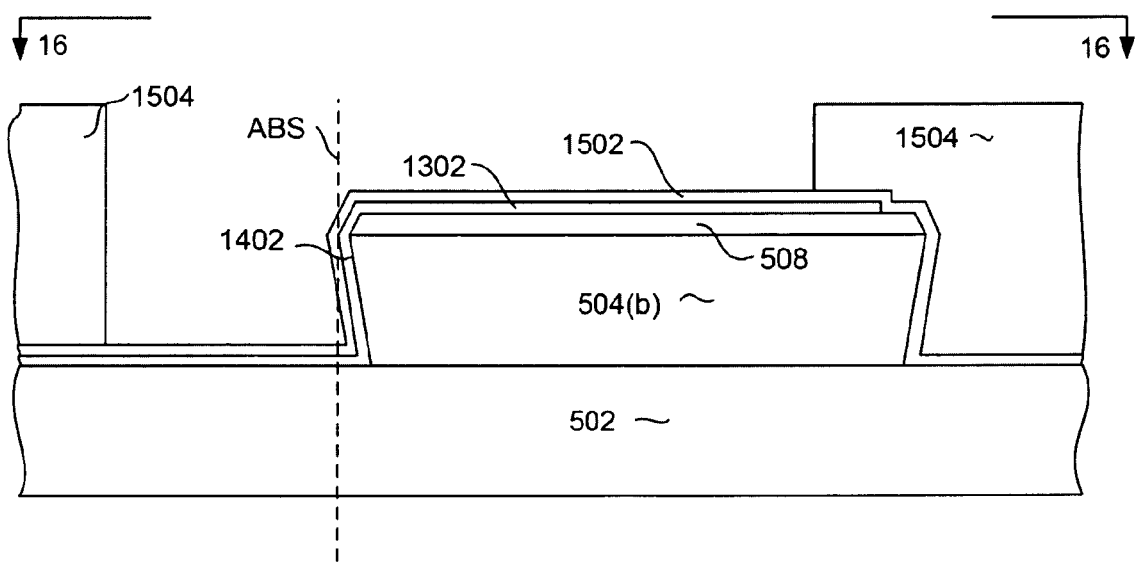
Figure 16:
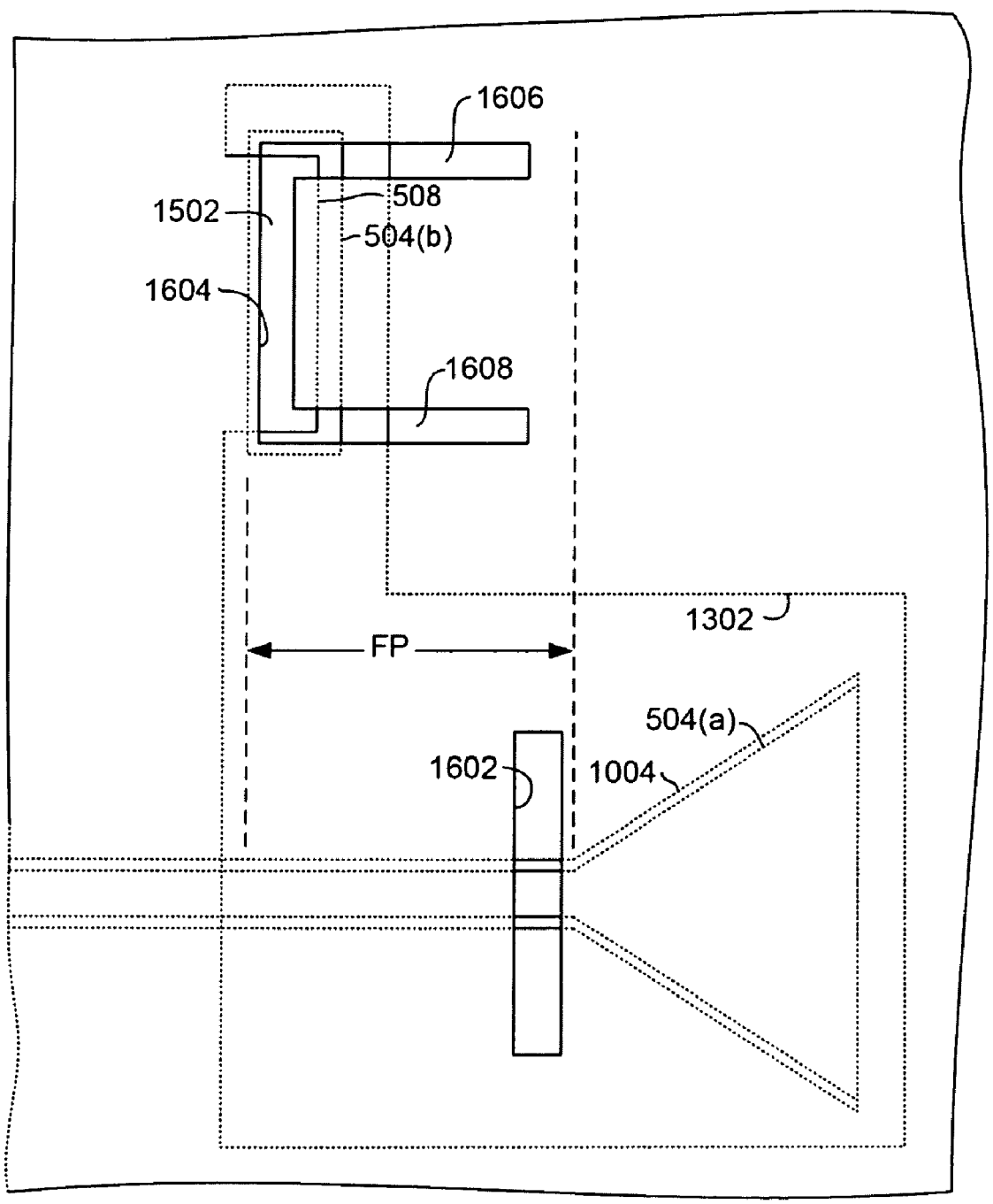
Figure 17:
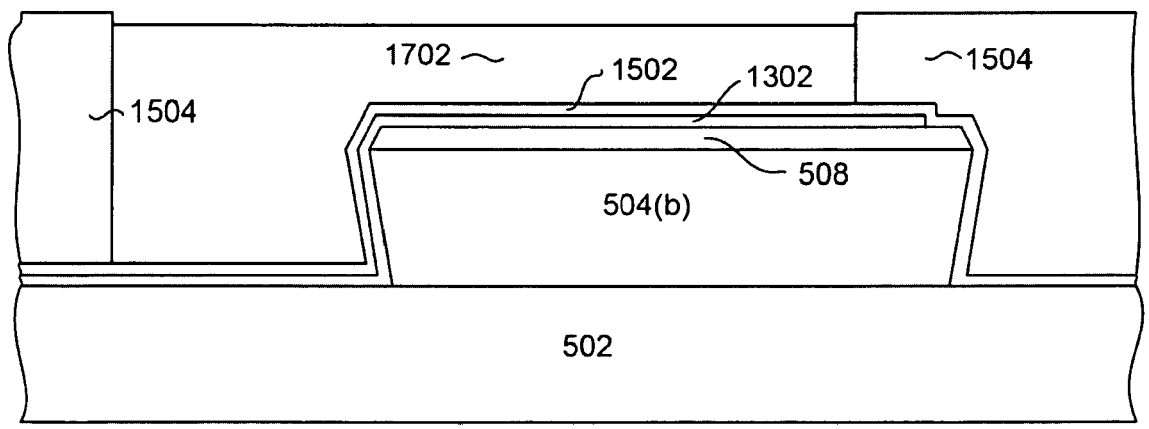
Figure 18:
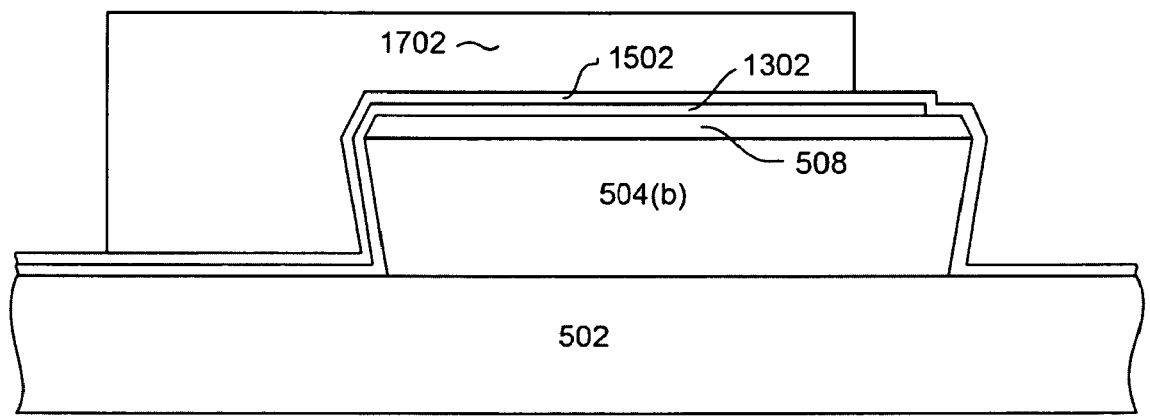
Figure 19:
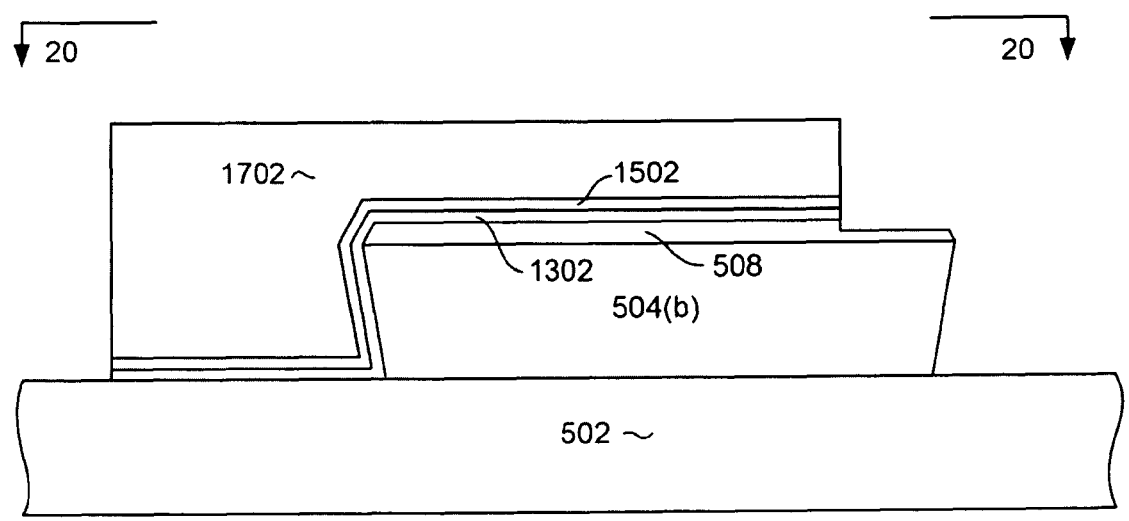

With reference to FIG. 15, an electrically conductive seed layer 1502 is deposited full film. This seed layer can be, for example, Rh and can be deposited by sputter deposition. In addition to being deposited over the write pole material lapping guide structure 504(b), the seed layer 1502 is also deposited over the write pole 504(a) (FIG. 13). A mask structure 1504 is then formed. As can be seen more clearly in FIG. 16, which shows a top down view as taken from line 16-16 of FIG. 15, the mask structure has an opening 1602 over a portion of the pole tip portion of the write pole 504(a), that is configured to define a trailing magnetic shield. The mask 1504 also has an opening 1604 over a portion of the lapping guide 504(b) which can be seen in cross section in FIG. 15. As seen in FIG. 15, the opening 1604 extends over a portion of the lapping guide layer 504(b), and also extends beyond the edge 1402 toward the lapping direction. The opening may also extend behind the lapping guide structure 504(b) to form contact tabs 1606, 1608 as shown in FIG. 16.

Then, a magnetic material such as CoFe or NiFe 1702 can be electroplated into the openings 1602, 1604. This is shown in cross section in the lapping guide region in FIG. 17. The mask 1504 can then be removed leaving a structure such as that shown in FIG. 18. A trailing, wrap around shield structure (not shown in FIG. 18) will also be left in the over the pole tip of the write pole.

A material removal process such as reactive ion etching is performed to remove portions of the Au layer 1302 and seed layer 1502 that are not protected by the magnetic material layer 1702, leaving a structure as in claim 19. As can be seen, the highly electrically conductive Au layer 1302 extends over the front edge 1402 of the structure 504(b).

Figure 20:
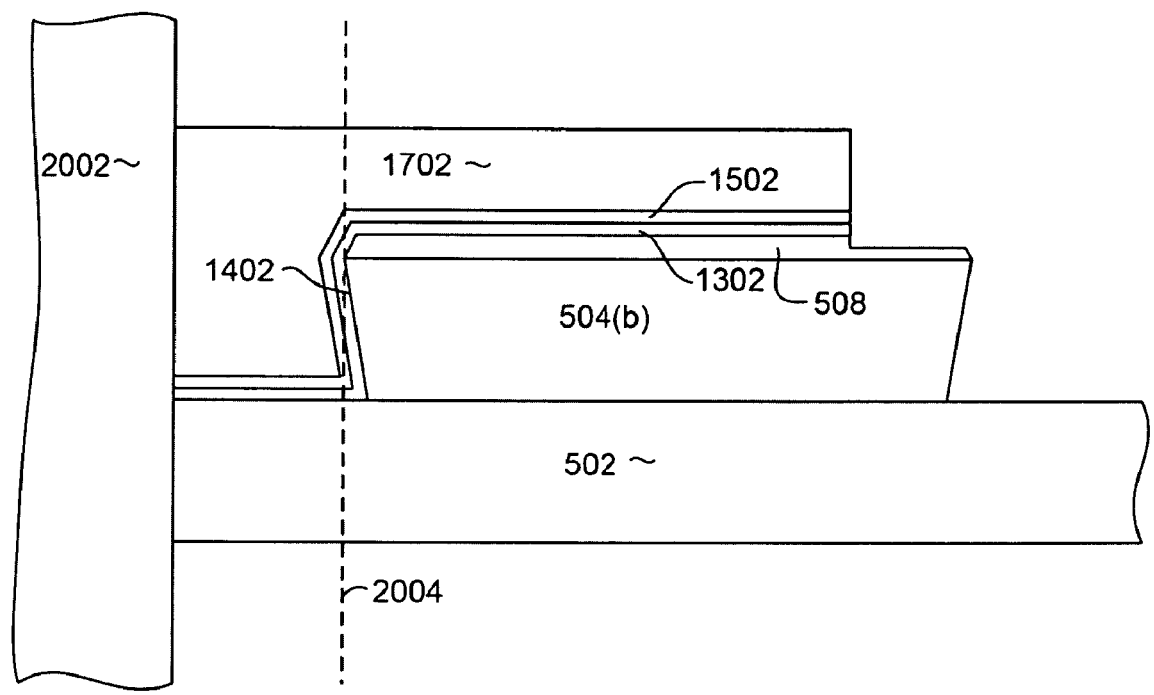

As those skilled in the art will appreciate, the air bearing surface of a slider can be formed by a lapping process. FIG. 20 illustrates such a process. After thousands of heads have been fabricated on a wafer, the wafer is sliced into rows. FIG. 20 shows a cross section of such a row being lapped, shown at the location of the lapping guide 504(b) described earlier. A lapping tool 2002 removes material from the wafer, (from the left as shown in FIG. 20). As described above, this lapping should be terminated exactly when the desired air bearing surface plane (ABS) has been reached. The lapping guide 504(b) allows an operator to determine when this lapping should be terminated. The amount by which lapping has progressed can be determined by measuring the electrical resistance across contact pads 1606, 1608 (FIG. 16).

However, it can be understood that initially as lapping progresses, the resistance across the lapping guide will be relatively low, due to the low resistance of the Au layer 1302. It can also be seen, however, that when the edge 1402 has been reached, the resistance of this Au layer 1302 will increase dramatically, because a relatively large amount of this highly conductive material 1302 will have been removed all at once (ie. when the lapping reaches the point indicated by dashed line 2004. This dashed line 2004 indicates the point at which the edge 1402 has been reached, at which point the resistance will increase dramatically. This point may be designed to coincide with the desired location of the air bearing surface ABS.

Figure 21:
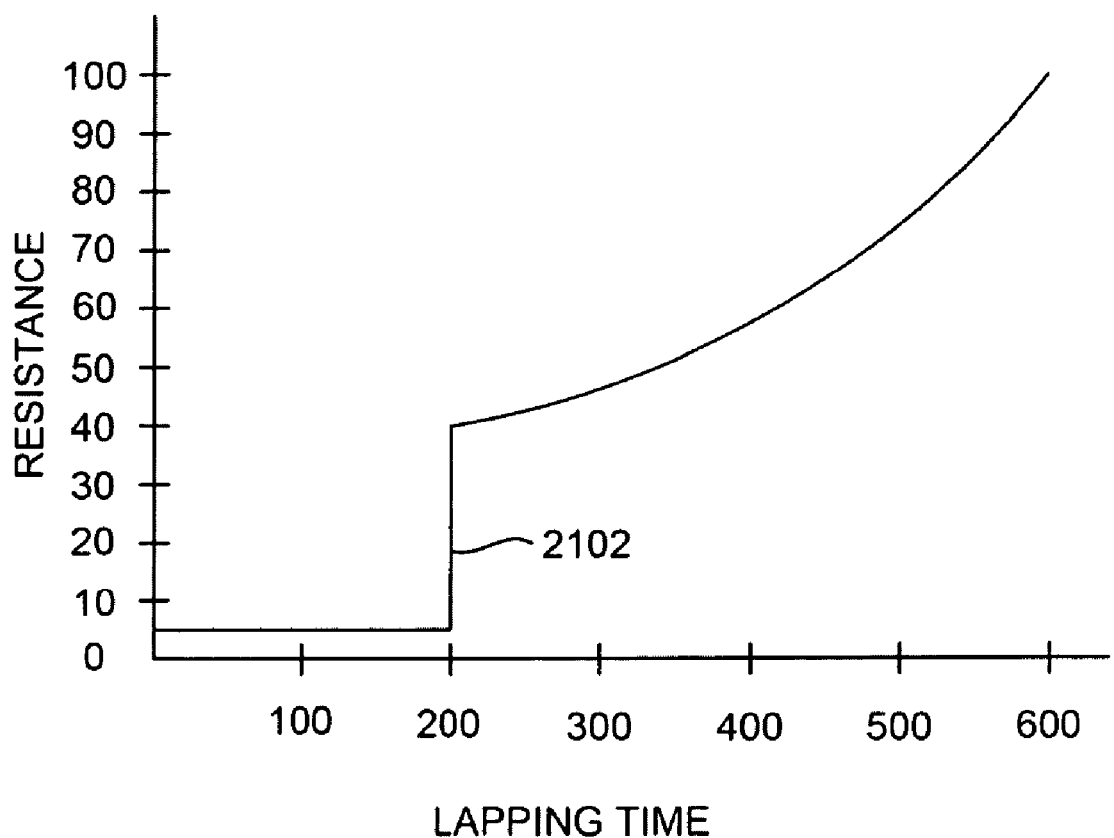
FIG. 21 is a graph of a resistance across a lapping guide of the present invention as lapping progresses.

FIG. 21 shows an example of how the resistance across the lapping guide can vary as lapping progresses. Because of the high conductivity of the Au layer 1302 (FIG. 20) the resistance remains relatively constant until point 2102, which coincides with the point at which lapping has reached the plane represented by dashed line 2004 in FIG. 20. At this point the resistance across the lapping guide increases dramatically because of the sudden loss of a large amount of the Au layer 1302 and loss of contact to the main pole laminate material. After this point 2102 the electrical resistance increases in a steady (although not necessarily linear) manner.

Because of the dramatic increase in resistance at location 2102, one can easily identify the point at which lapping should be terminated. What's more, the location of this point is determined by the front edge 1402, which is defined in the same patterning and processing steps that are used to define the write pole 504(a). Therefore, this location at which lapping should stop is easily and accurately located relative to the flare point of the write pole. This makes it possible to very accurately locate the flare point of the write pole 504(b) relative to the ABS in regardless of any manufacturing or patterning variations or deviations.

Figure 22:
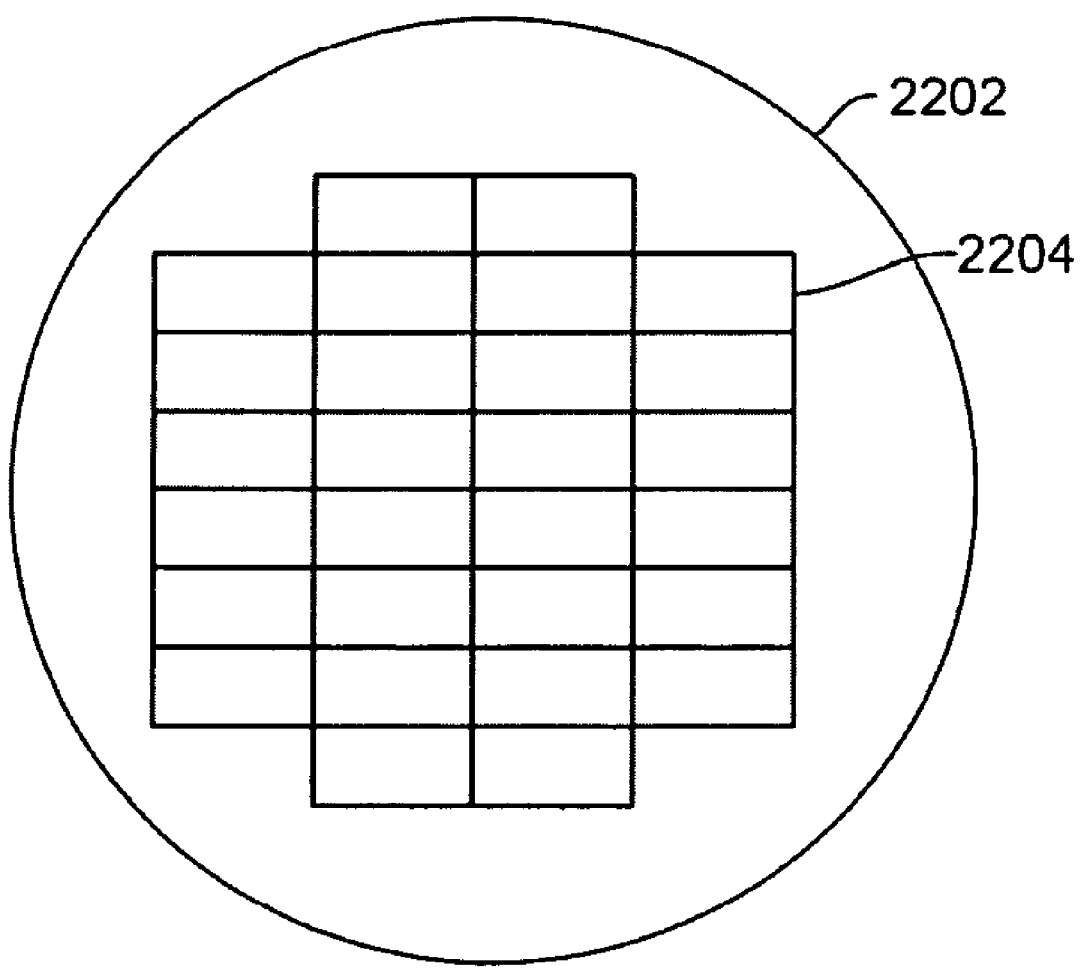
FIG. 22 is a top down view of a wafer on which sliders may be produced.
Figure 23:
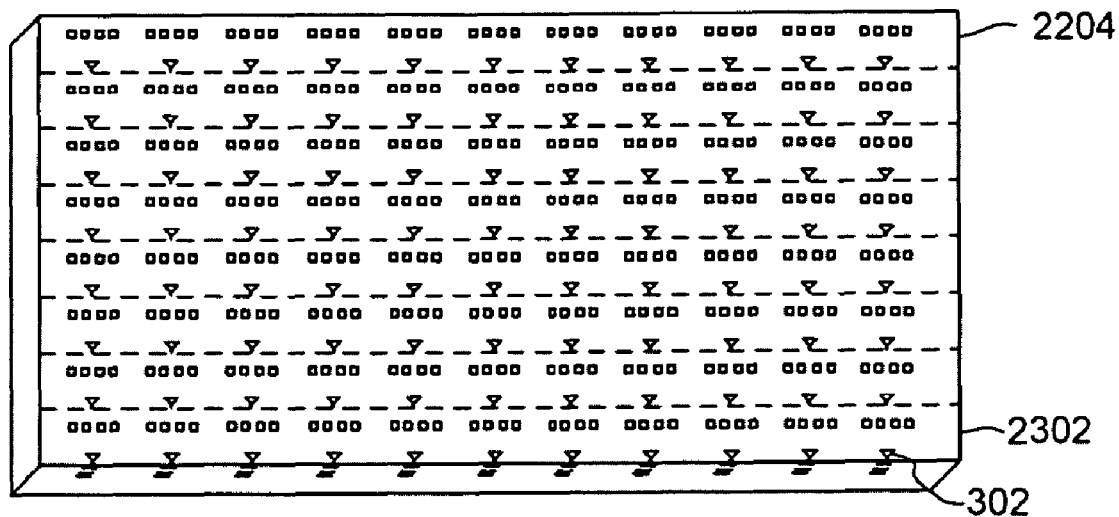
FIG. 23 is a perspective view of a quadrant of a wafer.

As those skilled in the art will appreciate, sliders and the magnetic heads thereon, are formed on a wafer, with many thousands of such sliders and heads being formed on a single wafer. FIG. 22 shows an example of such as wafer 2202. The wafer can include many quadrants 2204, each of which includes many rows of heads 2302, which can be seen in greater detail in FIG. 23. In FIG. 23, the rows 2302 of heads 302 are indicated as being separated by the dashed lines for purposes of illustration. After the heads have been formed on the wafer 2202, the wafer is cut into individual quadrants for further processing.

Figure 24:
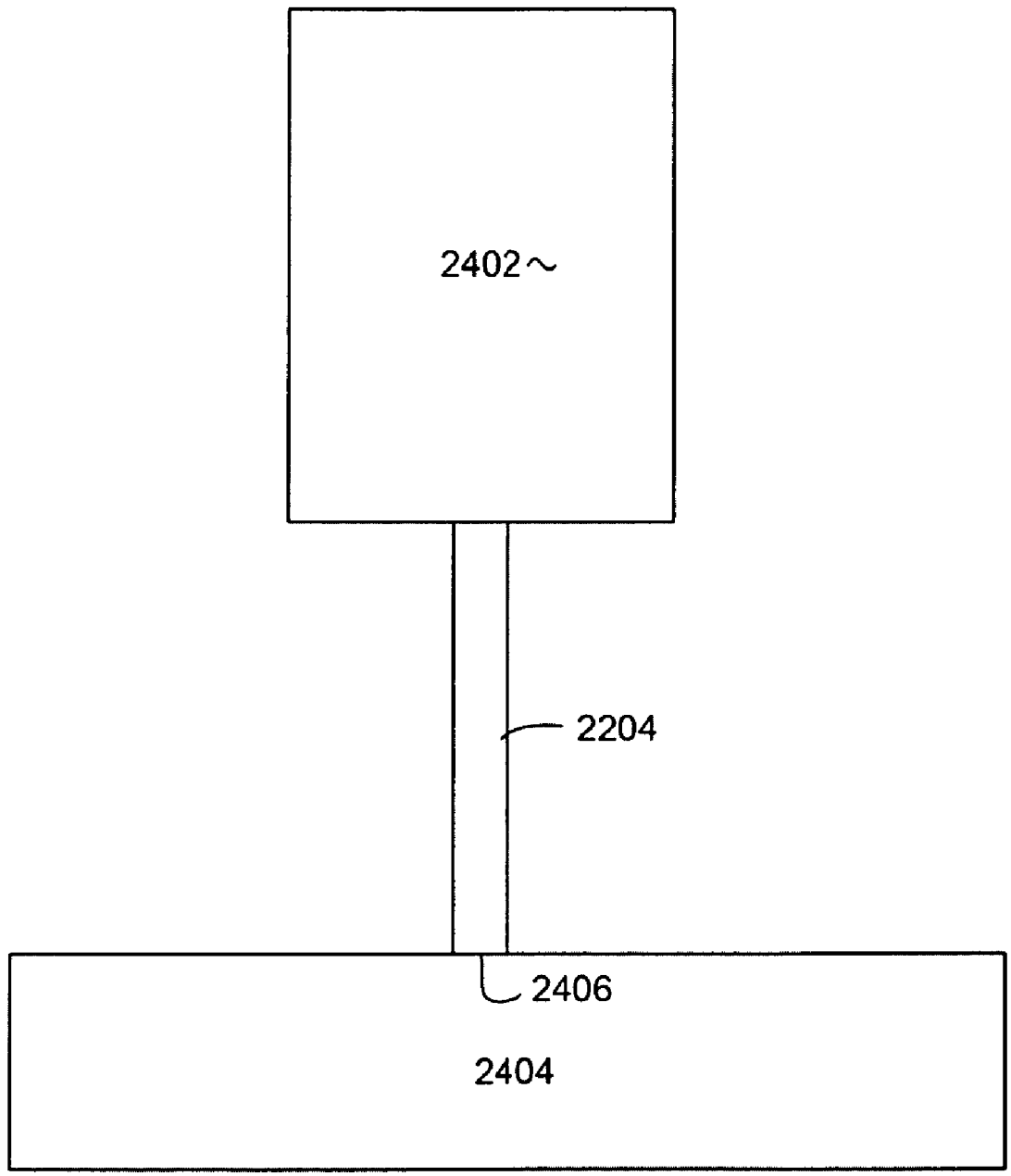
FIG. 24 is a view of a wafer quadrant in a lapping tool.
Figure 25:
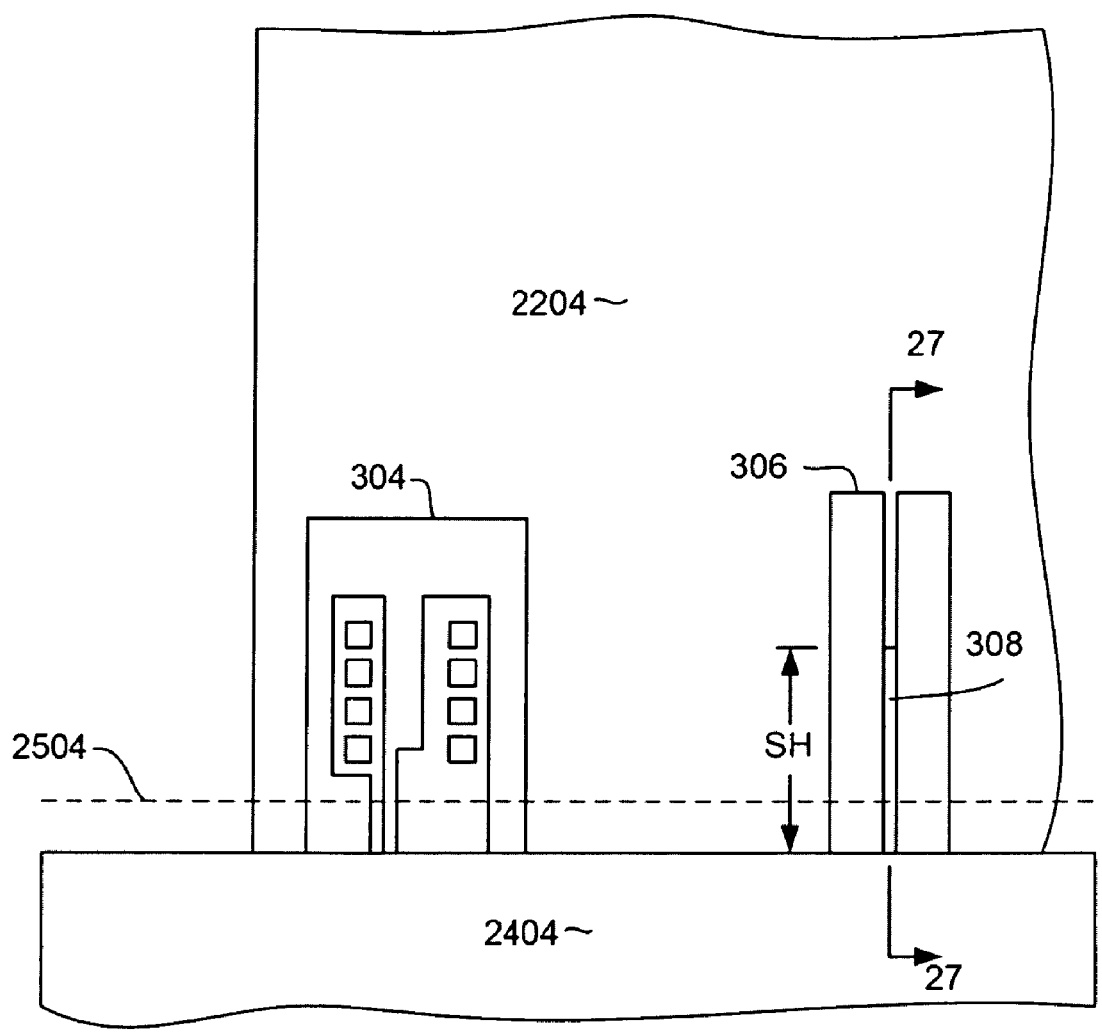
FIG. 25 is an enlarged view of a portion of a quadrant being lapped in a rough lapping process.

FIG. 24, shows a quadrant 2204 located within a lapping tool system. The quadrant 2204 is held by a tool 2402. The tool 2402 holds an edge 2406 of the quadrant 2204 against a lapping plate 2404, which polishes material off of the quadrant 2204. This can be seen in greater with reference to FIG. 25. FIG. 4 shows a quadrant 2204 with a read head 306 and a write head 304. The quadrant 2204 is undergoing a rough lapping, which is performed with the quadrant 2204 held substantially perpendicular to the lapping plate 2404. This lapping removes material until the line 2504 has been reached. This rough lapping defines a majority of the air bearing surface and also defines the stripe height SH of the sensor of the read head.

Figure 27:
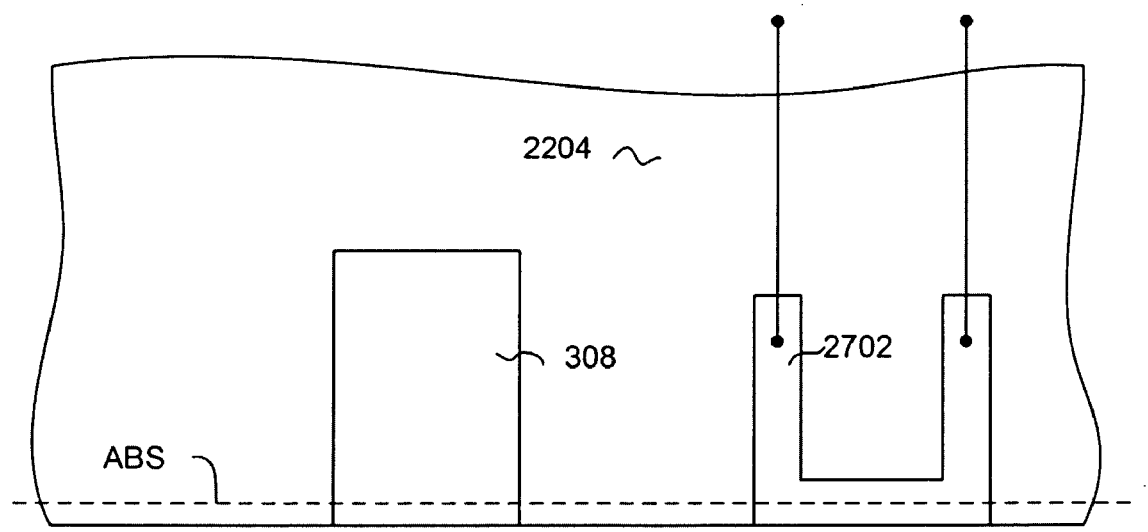
FIG. 27 is a cross sectional view taken from line 27-27 of FIG. 25, showing a read sensor lapping guide.

The termination point for this first lapping process can be determined by using a lapping sensor lapping guide. An example of such a lapping guide can be seen with reference to FIG. 27, which shows a cross sectional view as taken from line 27-27 of FIG. 25. The sensor lapping guide 2702 can be formed in the same plane as the sensor 308, and may be constructed of the same material as the sensor. By measuring the electrical resistance across the sensor lapping guide 2702, the amount by which lapping has progressed can accurately determined. As lapping removes material from the front edge of the lapping guide, the resistance across the lapping guide will increase, and this increase will be a substantially steady increase, as will be seen.

Figure 26:
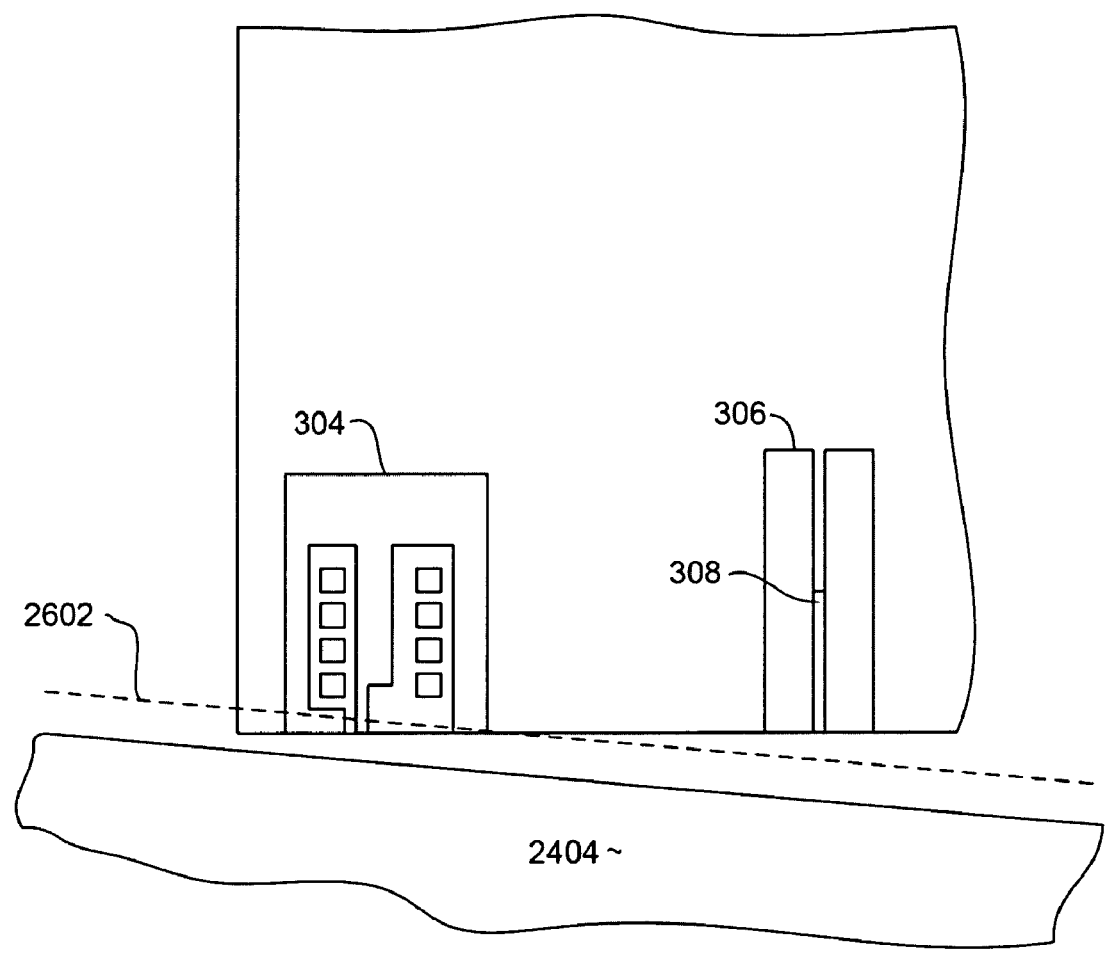
FIG. 26 is an enlarged view of a portion of a quadrant being lapped in a kiss lapping process.

With reference to FIG. 26, after the rough lapping has been performed, a light, angled lapping, often referred to as a "kiss lap" is performed. This kiss lapping can be performed at an angle as shown, so that more of the write head 304 is removed and less of the read head 306 is removed. As described above, the write head 304 employs a write current for inducing a magnetic write field. This current produces heat which, as a result of thermal expansion, causes the write head to protrude outward from the air bearing surface. In order to the prevent this protrusion from causing the write head 304 to crash into the disk during use, the write head 304 can be slightly recessed by the kiss lapping.

Therefore, this second lapping or kiss lapping defines critical features of the write head 304. More particularly, the kiss lapping defines the flare point FP (FIG. 4) of the write pole as it is measured from the ABS. In order to accurately define this flare point FP, a write pole lapping guide can be used to determine when this kiss lapping should be terminated. Such a lapping guide and its use have been described above, with reference to FIGS. 5-21.

Figure 28:
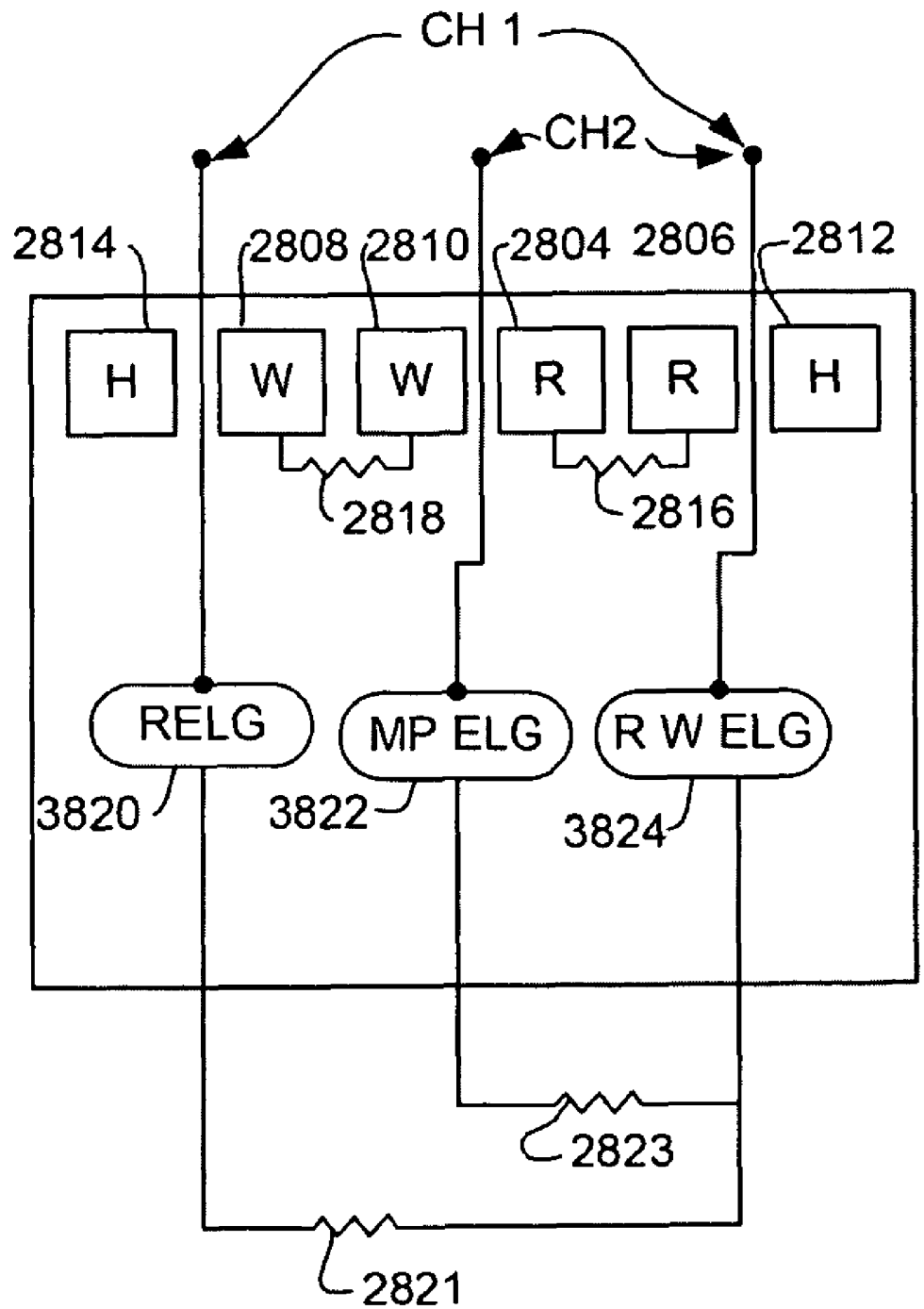
FIG. 28 is a view of a surface of a slider and monitoring channels according to the prior art.

FIG. 28 shows an end surface of a slider 2802 and shows read and write head contact pads and lapping guide pads according to a prior art arrangement. The slider surface 2802 includes first and second read head pads 2804, 4806 and first and second write head pads 2808, 2810. There may also be heating element pads 2812, 2814 for supplying a current to a beating element that may be used to control the fly height of the write head and possibly the read head. Shunt resistors 2816, 2818 may be provided to shunt the read head and write head during lapping to prevent damage to the read and write head during lapping.

With continued reference to FIG. 28, lapping guide contact pads are included as well. The slider may include a sensor ELG pad 2820 that is connected with the sensor ELG 2821, a write pole ELG pad 3822 that is connected with a write pole ELG 2823 and a read write ELG pad 3824 that is connected with both the writer and reader ELG 2821, 2823. In order to monitor lapping during the initial read head stripe height defining lapping, the resistance across the read sensor ELG is monitored across pads 3820 and 3824. Then, to monitor lapping during the write pole defining kiss lapping, the resistance across the write head ELG is measured across pads 3824, 3822. In prior art systems resistance change across both the read head lapping guide 2821 and write head lapping guide 2823 changes gradually as lapping progresses. For both lapping processes, the lapping is terminated when the resistance across each lapping guide 2823, 2821 reaches a predetermined value. This, therefore, requires two separate channels to be monitored, a first channel for monitoring the initial rough lapping using the sensor lapping guide 2823 and a second channel for measuring the kiss lapping.

As those skilled in the art will appreciate it is very desirable to minimize the number of channels that must be monitored. Measuring a channel requires that cables from a measurement tool be connected with various pads. The space available for such cables is extremely limited. However, because the prior art ELG systems employ lapping guides whose resistances change gradually at essentially steady state, two separate channels must be used to monitor the read and write lapping guides 2823, 2821. If a single channel were to be used measure the resistance of both the read and write ELGs 2823, 2821 in parallel it would be impossible to determine exactly where the second lapping should be terminated. Since the measured resistance would be a combination of the resistance of the read ELG 2821 and write ELG 2823, it would not be possible to tell how the resistance of the already lapped reader ELG was affecting the resistance of the writer ELG while both are being measured together.

Figure 29:
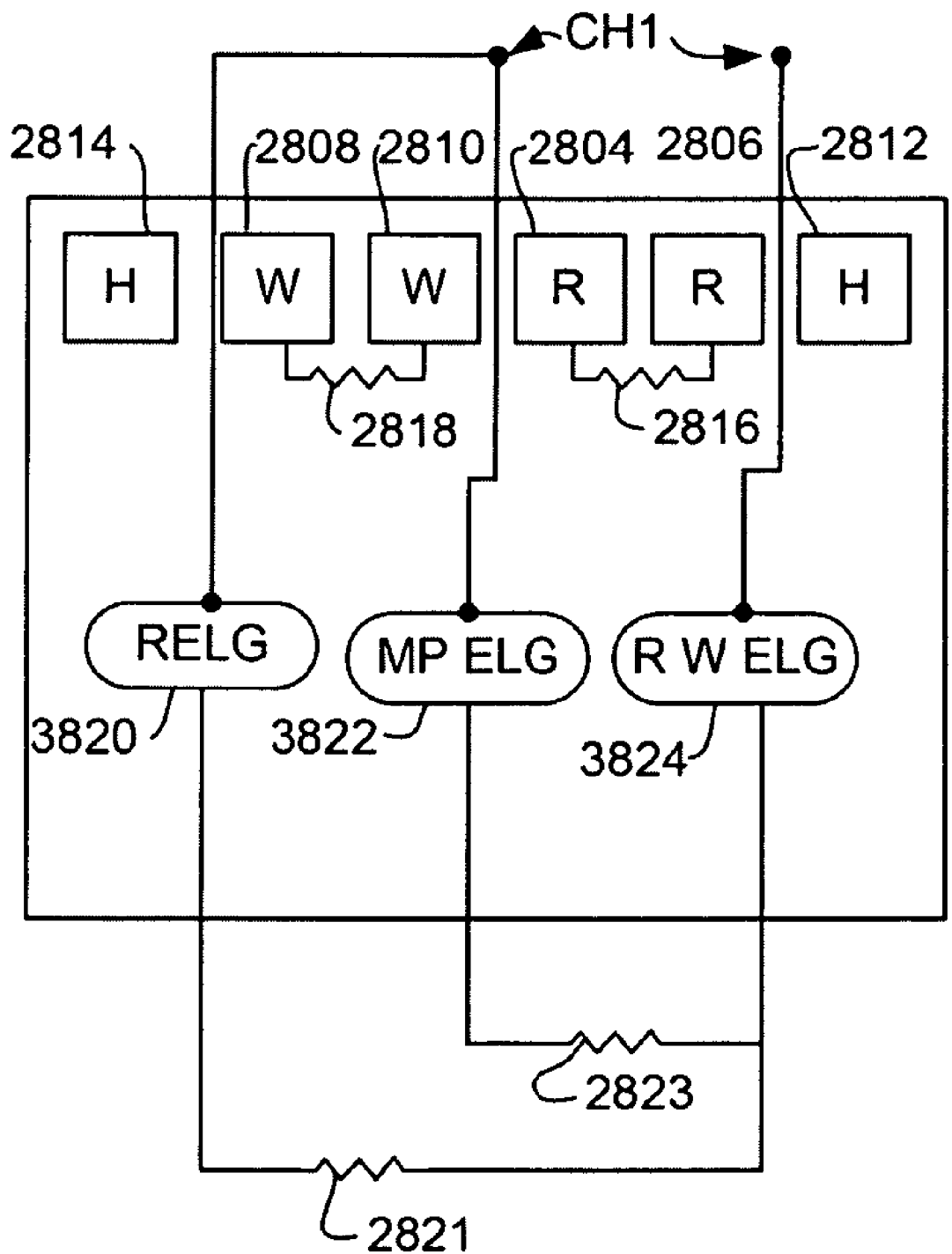
FIG. 29 is a view of a surface of and monitoring channels according to the present invention.
Figure 30:
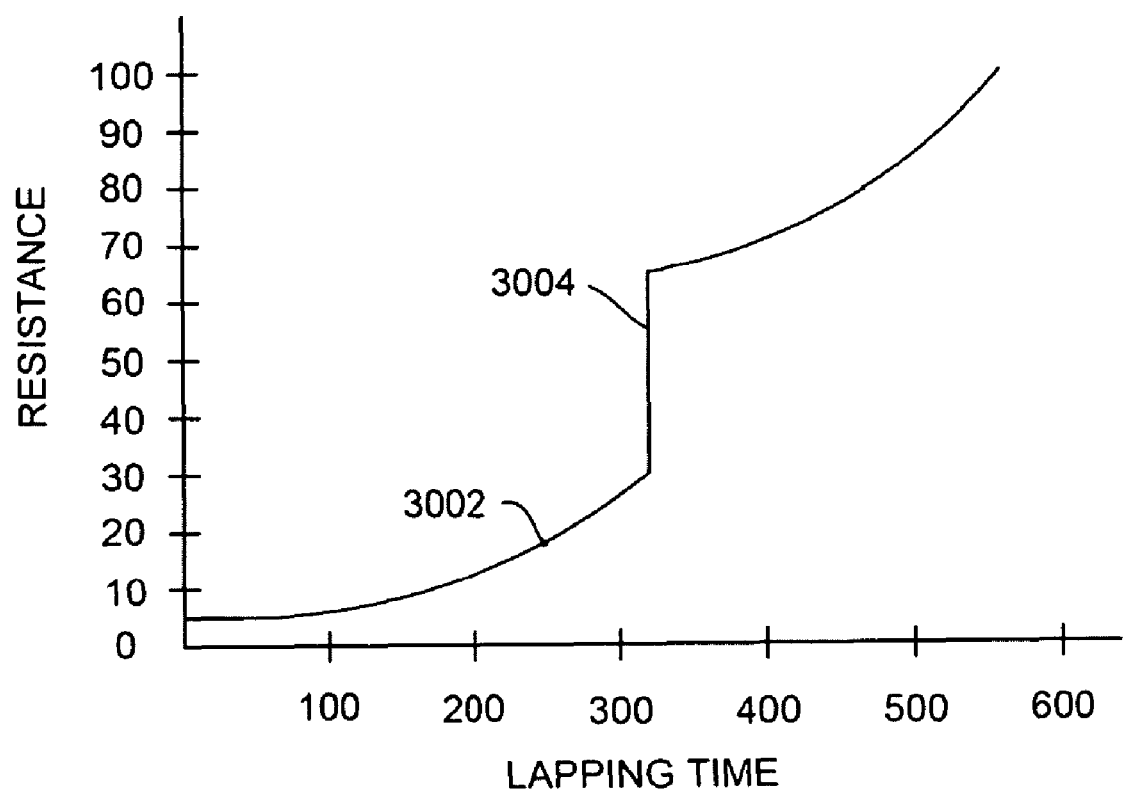
FIG. 30 is a graph illustrating a resistance change during initial lapping and kiss lapping.

The present invention allows the number of measured channels to be reduced from two channels as shown in FIG. 28 to only one channel as shown in FIG. 29. As can be seen in FIG. 29, one channel is used to measure the resistance of both the writer ELG 2823 and the reader ELG 2821. The measurement of this combined resistance across both ELGs 2823, 2821 can be seen in the graph illustrated in FIG. 30. During the initial rough lapping, the amount by which lapping has progressed can be determined, because the operator is starting with a known ELG thickness and depth. The resistance increases steadily until a desired combined resistance point 2102 has been reached. The initial, rough lapping is then terminated. Then, during the second lapping, even though the lapped read sensor ELG 2821 affects the overall resistance to an unknown extent, the point at which the kiss lapping should be terminated can be easily located at the point at which the combined resistance exhibits a dramatic increase 2104. This indicates the point at which the front edge 1402, or location 2004 has been reached in the lapping guide illustration of FIG. 20. The termination point of the final kiss lapping is determined, therefore, not by reaching a predetermined resistance value, but by detecting a sudden, dramatic increase or jump in resistance. This, therefore, allows both the initial rough lapping and the final kiss lapping to be monitored using a single measurement channel rather than two measurement channels. This of course cuts the number of necessary channels in half.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic disk drive comprising:
   providing a substrate;
   forming a write pole on the substrate, the write pole having a flare point; and
   forming lapping guide on the substrate, at least a portion of the lapping guide being formed simultaneously with the formation of the write pole, the lapping guide being formed with an edge feature that is located aligned relative to the flare point;
   wherein in the edge feature comprises a layer of magnetic material having an edge that is oriented non-parallel with the substrate, the lapping guide further comprising a layer of electrically conductive material that extends over the edge feature.

2. A method for manufacturing a magnetic disk drive comprising:
   providing a substrate;
   forming a write pole on the substrate, the write pole having a flare point; and
   forming lapping guide on the substrate, at least a portion of the lapping guide being formed simultaneously with the formation of the write pole, the lapping guide being formed with an edge feature that is located aligned relative to the flare point;
   wherein the electrically conductive material comprises Au or Cu.

3. A method for manufacturing a magnetic disk drive comprising:
- providing a substrate;
- forming a write pole on the substrate, the write pole having a flare point; and
- forming lapping guide on the substrate, at least a portion of the lapping guide being formed simultaneously with the formation of the write pole, the lapping guide being formed with an edge feature that is located aligned relative to the flare point;
- wherein both the write pole and the lapping guide comprise a lamination of magnetic layers separated by thin non-magnetic layers.

4. A method for manufacturing a magnetic disk drive comprising:
- providing a substrate;
- forming a write pole on the substrate, the write pole having a flare point; and
- forming lapping guide on the substrate, at least a portion of the lapping guide being formed simultaneously with the formation of the write pole, the lapping guide being formed with an edge feature that is located aligned relative to the flare point;
- further comprising,
  - simultaneously forming a magnetic structure over the write pole and a magnetic structure over the edge feature and electrically conductive material, the magnetic structure over the write pole being configured as a trailing-wrap around magnetic shield.

5. A method for manufacturing a magnetic write head for data recording, comprising:
- providing a substrate;
- depositing a magnetic write pole material over the substrate;
- forming a first mask structure over the magnetic write pole material, the makes structure including a first portion in a write pole area that is configured to define a write pole with a flare point, and a second portion in a lapping guide region that is configured to define a lapping guide;
- performing an ion milling to remove portions of the write pole material that are not protected by the first mask structure, thereby forming a first magnetic write pole layer portion that defines the write pole and a second magnetic write pole portion that defines the lapping guide step structure, the step structure having an edge feature;
- forming a second mask structure, the second mask structure covering the write pole and leaving at least a portion of the lapping guide step structure uncovered;
- depositing an electrically conductive material; and
- removing the second mask structure.

6. The method as in claim 5 wherein the electrically conductive material comprises Au.

7. The method as in claim 5 further comprising, before forming the second mask structure, removing the first mask structure.

8. The method as in claim 5 further comprising, after performing the ion milling and before forming the second mask structure, conformally depositing a layer of non-magnetic material, and then performing a material removal process to form non-magnetic side walls sides of the write pole.

9. The method as in claim 8 wherein the conformally depositing a non-magnetic material comprises depositing alumina by atomic layer deposition, and wherein the material removal process comprises ion milling.

10. The method as in claim 8 wherein the conformally deposited non-magnetic material is deposited over the write pole and wherein a liftoff process is used to prevent the conformally deposited non-magnetic material from being deposited over the lapping step structure.

11. The method as in claim 5 wherein a liftoff process is used to prevent the electrically conductive material from being deposited over the lapping guide step structure.

12. The method as in claim 5 further comprising simultaneously forming a magnetic shield over the write pole and a magnetic lapping guide structure over the magnetic lapping guide step structure and the electrically conductive material.

13. The method as in claim 5 further comprising, performing a lapping operation, and terminating the lapping operation when the edge of the lapping guide step structure has been reached.

14. The method as in claim 5 further comprising, performing a lapping operation while measuring an electrical resistance across the electrically conductive material, and terminating the lapping when a sudden increase in electrical resistance indicates that the edge of the lapping guide has been reached.

* * * * *